United States Patent
Loomis

[11] Patent Number: 5,899,957
[45] Date of Patent: * May 4, 1999

[54] CARRIER PHASE DIFFERENTIAL GPS CORRECTIONS NETWORK

[75] Inventor: Peter Van Wyck Loomis, Sunnyvale, Calif.

[73] Assignee: Trimble Navigation, Ltd., Sunnyvale, Calif.

[*] Notice: This patent is subject to a terminal disclaimer.

[21] Appl. No.: 08/812,921

[22] Filed: Mar. 10, 1997

Related U.S. Application Data

[63] Continuation of application No. 08/572,875, Dec. 18, 1995, abandoned, which is a continuation of application No. 08/177,011, Jan. 3, 1994, Pat. No. 5,477,458.

[51] Int. Cl.$^6$ .......................... G06F 165/00; G01C 21/00; G06G 7/78

[52] U.S. Cl. .......................... 701/214; 701/215; 340/988; 342/357; 342/450

[58] Field of Search .................................... 701/207, 225, 701/213, 214, 215, 300; 342/352, 357, 358, 450, 457, 463; 340/998, 990, 995

[56] References Cited

U.S. PATENT DOCUMENTS

| | | |
|---|---|---|
| 3,520,128 | 7/1970 | Novikov et al. . |
| 3,811,265 | 5/1974 | Cater . |
| 3,852,534 | 12/1974 | Tilk . |

(List continued on next page.)

OTHER PUBLICATIONS

G. Wubbena, "Kinematic Positioning With Carrier Phases and 'On The Way' Ambiguity Solution", Proc. 5th Intl. Geodetic Symposium on Satellite Positioning, Alburquerque N.M., Mar. 13–17, 1989, pp. 600–609.

P. Loomis, "A Kinematic GPS Double Differencing Algorithm", Proc. 5th Intl. Geodetic Symposium on Satellite Positioning, Alburquerque N.M., Mar. 13–17, 1989, pp. 610–620.

(List continued on next page.)

*Primary Examiner*—Jacques H. Louis-Jacques
*Assistant Examiner*—Tim Wyckoff
*Attorney, Agent, or Firm*—John Schipper

[57] ABSTRACT

Method and apparatus for providing GPS pseudorange correction information over a selected geographic region S with a diameter of up to 300 km with an associated inaccuracy no greater than 5 cm. N spaced apart GPS reference stations (N>4), whose location coordinates $(u_n, v_n, w_n)$ are fixed and are known with high accuracy, are provided within or adjacent to the region R. Each reference station $n(n=1, 2, \ldots, N)$ receives GPS signals from at least four common-view GPS satellites, numbered $m=1, 2, \ldots, M$ ($M \geq 4$), computes its own GPS-determined location coordinates, compares these coordinates with its known location coordinates, determines the pseudorange corrections PRC(t;t0;m;n) for its GPS-determined location, and transmits these correction signals to a central station located within or adjacent to the region S. The central station retransmits the pseudorange correction signals throughout the region S. A mobile GPS station within or adjacent to the region S has stored within it the coordinates (u',v',w') of the GPS-determined last location of that mobile station and the spatial coordinates $(u_{n(k)}, v_{n(k)}, w_{n(k)})$ ($k=1, 2, \ldots, K; K>3$) of K GPS reference stations within S that are closest to the last-determined location of that mobile station. The mobile station then computes the differential GPS corrections for the GPS-determined present location of that mobile station. Alternatively, the reference stations can transmit to the central station unprocessed GPS signals for determination of the pseudorange correction signals at the central station. This approach can be modified if the region R is two-dimensional, where only two coordinates u and v are needed, or if the region R is one-dimensional, where only one coordinate u is needed. Suitable algorithms for selection of the coefficients $a_{k'}$ are discussed.

24 Claims, 3 Drawing Sheets

U.S. PATENT DOCUMENTS

| | | |
|---|---|---|
| 3,881,310 | 5/1975 | Gerum et al. . |
| 3,941,984 | 3/1976 | Chappell et al. ............... 235/150.27 |
| 4,014,166 | 3/1977 | Cateora et al. ..................... 58/26 |
| 4,042,923 | 8/1977 | Merrick ............................. 343/6.5 |
| 4,218,654 | 8/1980 | Ogawa et al. . |
| 4,287,597 | 9/1981 | Paynter ............................. 455/12 |
| 4,292,683 | 9/1981 | Jueneman . |
| 4,334,314 | 6/1982 | Nard et al. . |
| 4,337,463 | 6/1982 | Vangen . |
| 4,405,986 | 9/1983 | Gray . |
| 4,445,118 | 4/1984 | Taylor et al. ..................... 343/357 |
| 4,449,830 | 5/1984 | Bulgier . |
| 4,463,357 | 7/1984 | MacDoran . |
| 4,494,211 | 1/1985 | Schwartz ........................ 364/571 |
| 4,543,657 | 9/1985 | Wilkinson . |
| 4,578,678 | 3/1986 | Hurd ............................... 343/357 |
| 4,582,434 | 4/1986 | Plangger et al. . |
| 4,607,257 | 8/1986 | Noguchi . |
| 4,646,096 | 2/1987 | Brown ............................ 342/357 |
| 4,751,512 | 6/1988 | Longaker ........................ 342/357 |
| 4,797,677 | 1/1989 | MacDoran et al. ............. 342/352 |
| 4,809,005 | 2/1989 | Counselman ................... 342/357 |
| 4,812,991 | 3/1989 | Hatch ............................. 364/458 |
| 4,814,711 | 3/1989 | Olsen et al. .................... 324/331 |
| 4,860,018 | 8/1989 | Counselman III . |
| 4,870,422 | 9/1989 | Counselman III .............. 342/357 |
| 4,912,475 | 3/1990 | Counselman III .............. 342/352 |
| 4,963,889 | 10/1990 | Hatch ............................ 342/357 |
| 5,072,227 | 12/1991 | Hatch ............................ 342/357 |
| 5,099,245 | 3/1992 | Sagey ............................ 342/357 |
| 5,111,209 | 5/1992 | Toriyama ....................... 342/357 |
| 5,138,631 | 8/1992 | Taylor . |
| 5,148,179 | 9/1992 | Allison .......................... 342/357 |
| 5,155,490 | 10/1992 | Spradley et al. .............. 342/357 |
| 5,194,871 | 3/1993 | Counselman III ............. 342/357 |
| 5,220,333 | 6/1993 | Penrod .......................... 342/389 |
| 5,343,209 | 8/1994 | Sennott et al. ................. 342/357 |
| 5,471,217 | 11/1995 | Hatch et al. ................... 342/357 |
| 5,471,218 | 11/1995 | Talbot et al. ................... 342/457 |
| 5,477,458 | 12/1995 | Loomis ......................... 364/449 |
| 5,519,620 | 5/1996 | Talbot et al. ................... 364/449 |
| 5,563,917 | 10/1996 | Sheynblat ...................... 375/346 |

OTHER PUBLICATIONS

Tom Logsdon, *The NAVSTAR Global Positioning System,* Van Nostrand Reinhold, 1992, pp. 33–90.

GPS Interface Control Document ICD–GPS–200, Rockwell Int'l. Corp., Satellite Systems Div., Rev. A, Sep. 26, 1984.

P. Hwang, "Kinematic GPS for Differnetial Positioning: Resolving Integer Ambiguities on the Fly", Navigation, vol. 38, pp. 1–15.

Peter V. W. Loomis et al., "Differential GPS Network Design,"ION GPS–91, Sep. 12, 1991.

G. Jeffrey Geier et al., "System Analysis for a Kinematic Positioning System Based on the GPS," U.S. Army Topographic Engineering Center, pp. 1–133, Dec. 1992.

CARRIER PHASE DIFFERENTIAL GPS CORRECTIONS NETWORK

This application is a continuation of application Ser. No. 08/572,875, filed Dec. 18, 1995, now abandoned, which is a continuation of patent application U.S. Ser. No. 08/177,011, filed on Jun. 3, 1994, now U.S. Pat. No. 5,477,458, assigned to the same Assignee as this application.

FIELD OF THE INVENTION

This invention relates to a network of stations for providing carrier phase corrections for GPS and other Satellite Positioning Systems over a wide area, for enhancing carrier phase accuracy in positioning and navigation.

BACKGROUND OF THE INVENTION

Differential corrections for location information provided by a global positioning system (GPS) offer the possibility of reducing the inaccuracies in location and observation time provided by such system from tens of meters and tens of nanoseconds to one meter or less and one nanosecond or less, respectively. However, differential GPS (DGPS) corrections for determinations of location and/or time are usually limited to a region no more than a few hundred kilometers (km) in diameter. For regions of larger diameter, errors due to differences in ionospheric delay, tropospheric delay, presence of multipath signals and similar phenomena accumulate and can increase the total location error of a DGPS calculation to tens of meters.

Carrier phase measurements using the Navstar Global Positioning System (GPS) allow the measurement of short baselines (<300 kilometers) with an inaccuracy as low as a few centimeters. Originally limited to static situations with the signal antennas remaining stationary over a time interval as long as one hour, this technology has been extended to allow one antenna to move relative to another antenna (kinematic survey mode) over baselines as short as 20–30 km. More recently, real time location determination systems have appeared that allow such baseline measurements in the field. This extends carrier phase applications from traditional mapping and control survey into new positioning and navigation applications with centimeter-level accuracy. These new systems are especially sensitive to small biases when recovering from carrier lock loss, which might occur when the GPS antenna moves under a tree or highway overpass or past a tall building. For this reason, these new systems are limited to relatively short baselines, to prevent the systematic biases that accumulate over distance from affecting the reacquisition process, including phase integer ambiguity resolution after carrier lock loss.

Phase integer ambiguity resolution techniques use interferometric approaches. Three resolution techniques are widely used with GPS. Two of these techniques, code averaging and kinematic Doppler analysis, produce location errors that are linear with respect to small bias errors. See U.S. Pat. Nos. 4,812,991 and 4,963,889, issued to R. Hatch, and G. Seeber and O. Wubbena, "Kinematic Positioning With Carrier Phases And 'On The Way' Ambiguity Solution", Proc. Fifth Intl. Geodetic Symposium on Satellite Positioning, Albuquerque, N. Mex., Mar. 13–17, 1989, pp. 600–609, for a discussion of the code averaging technique. See P. Loomis, "A Kinematic GPS Double Differencing Algorithm", Proc. Fifth Intl. Geodetic Symposium on Satellite Positioning, Albuquerque, N. Mex., Mar. 13–17, 1989, pp. 610–620, and P. Hwang, "Kinematic GPS for Differential Positioning: Resolving Integer Ambiguities on the Fly", Navigation, vol. 38, pp. 1–15, for a discussion of kinematic Doppler analysis.

A third technique, referred to here as the Maximum Likelihood Integer Ambiguity Resolution (MLIAR) technique is potentially the most powerful and efficient, but this technique is nonlinear with respect to small bias errors in the input signals. An MLIAR solution may show no perceptible response to inclusion of small bias errors until these errors grow to a threshold size, at which point the integer solution chosen becomes a false set of integers and the phase solution may change by many wavelengths (tens of decimeters).

The current approach to limiting the effect of bias errors in the MLIAR technique is to keep the baselines relatively short, no more than 30 km, so that bias errors are no more than 1 mm per km of baseline length. The U.S. Department of Defense proposes to degrade the accuracy by disguising the true orbits, thereby imposing Selective Availability on the clock and orbit information received from the satellites. This would increase the bias errors about ten-fold and would reduce the maximum acceptable baseline lengths for MLIAR by a similar factor.

Several workers have disclosed time distribution systems using a master or base station and one or more subsidiary time signal receivers. An example is U.S. Pat. No. 3,520, 128, issued to Novikov et al. An independent primary clock is connected to, and provides exact time signals for, a plurality of secondary clocks by radio waves. Each secondary clock receives a sequence of uncorrected "exact" time signals and a sequence of timing marks to correct this uncorrected time. The time signals for each secondary clock are apparently corrected separately.

Cater, in U.S. Pat. No. 3,811,265, discloses transmission of coded, time-indicating signals from a master clock at a central station to one or more slave clocks, using a two-wire line and binary-valued pulses with different time durations. A time synchronizing pulse is periodically inserted (e.g., once per second) on the line to correct for drift or other errors. If the two-wire line is a standard 60-cycle power line or a television cable, the binary-valued pulses use one or more frequencies that lie outside the frequency range normally used on that line, to avoid signal interference with the standard signals transmitted over that line.

A clock that can be synchronized by "wireless" signals is disclosed by Gerum et al in U.S. Pat. No. 3,881,310. The clock contains an electromagnetically operated mechanical oscillator whose frequency 2f0 is twice the rated frequency of an alternating current network connected to the clock. A time synchronization module transmits a signal of frequency f1>>f0 that is modulated by the network at 2f0 and received and demodulated by the clock. Normally, the pulses received from the network drive the clock and the oscillator is in a standby mode. The clock oscillator is enabled, and the network is disconnected, when and only when the network frequency differs by at least a predetermined amount from the frequency 2f0 of the oscillator. The oscillator in standby mode receives resonance energy of frequency≈2f0 from the network for maintaining the oscillations.

Chappell et al, in U.S. Pat. No. 3,941,984, discloses a satellite-aided navigation system in which location fixes of a mobile station are made at selected times. Between any two such selected times, the mobile station velocity is determined using Doppler shifts of signals received from the satellites. These velocities, measured at intermediate times, are converted to location coordinate increments and added to the location coordinates given by the last location fix to provide intermediate location coordinates between consecutive location fixes.

Cateora et al, in U.S. Pat. No. 4,014,166, disclose a satellite-controlled digital clock system for maintaining time synchronization. A coded message containing the present time and satellite position is transmitted from a ground station to an orbiting satellite and is relayed to a group of ground-based receivers. A local oscillator aboard the satellite is phase-locked to a precise frequency to provide the system with accurate time-of-year information by a count of the accumulated pulses produced by the oscillator. This count is compared with a time count determined from the coded message received by the satellite. After a selected number of errors are observed through such comparisons, the on-board clock is reset to the time indicated by the coded messages received. If transmission of the coded messages is interrupted, the on-board oscillator continues to provide time information that is transmitted to the ground-based receivers.

U.S. Pat. No. 4,042,923, issued to Merrick, discloses a trilateralization method for determination of location coordinates of a mobile station. Two stationary transceivers, each having a known location and being spaced apart, each transmit a stream of timed radar pulses having a unique code embedded therein, and these two streams are received by the mobile station. The mobile station fixes and stores its present location by determining the average distance between itself and each of the transceivers in a particular time interval of length approximately 1–1000 μsec, using triangulation. If the changes of the mobile station location coordinates are not within reasonable limits, the location fix is rejected and the last valid location fix is used.

An antenna space diversity system for TDMA communication with a satellite is disclosed by U.S. Pat. No. 4,218,654, issued to Ogawa et al. Differences of temporal lengths of paths from the satellite through each antenna to a ground-based signal processor station are determined by measurement of times required for receipt of pre-transmission bursts sent in the respective allocated time slots through two different antennas, in a round trip from base station to satellite to base station. Variable time delays are then inserted in the base station signal processing circuits to compensate for the temporal length differences for the different signal paths. These time delays are changed as the satellite position changes relative to each of the antennas.

U.S. Pat. No. 4,287,597, issued to Paynter et al, discloses receipt of coded time and date signal from two geosynchronous satellites, which signals are then converted into local date and time and displayed. The frequency spectrum is scanned by an antenna to identify and receive the satellite signals. Temporal length differences for signal paths from each satellite through a receiving antenna to a signal processing base station are determined, to provide compensation at the base station for these differences. Time information is provided by a satellite every 0.5 seconds, and this information is corrected every 30 seconds. Signals from either or both satellites are used to provide the time and date information, in normal local time and/or daylight savings local time.

Jueneman discloses an open loop TDMA communications system for spacecraft in U.S. Pat. No. 4,292,683. A spacecraft, such as a satellite, in quasi-geosynchronous orbit carries a transponder that relays a coded signal from a ground-based signal-transmitting station to a plurality of spaced apart, ground-based receivers. This coded signal includes a time index and an index indicating the spacecraft's present position. The time index is adjusted by each receiver to compensate for the changing position of the spacecraft through which the coded signal is relayed. The system is open loop and requires no feedback from the receivers to the base station.

Nard et al, in U.S. Pat. No. 4,334,314, disclose a system for radio wave transmission of time-referenced signals between two ground-based stations, with compensation for multi-path transmission timing errors. Station no. 1 has a single antenna. Station no. 2 has two antennas, spaced apart by a selected distance, to allow measurement of and compensation for multi-path transmission path length differences. A signal processor located at the receiver antenna combines a plurality of timing marks, received from the transmitting antenna along multiple paths, into a single timing mark that compensates for the multiple path length differences. This arrangement allegedly allows station-to-station transmission over distances as large as ten times the trans-horizon or direct sighting distance (which is approximately proportional to the square root of the product of antenna height and Earth's radius).

U.S. Pat. No. 4,337,463, issued to Vangen, discloses time synchronization between a master station and a remote station in which a coded message, transmitted by the master station, is received by and activates a counter in, the remote station. The remote station adds to the time value contained in the coded message the length of the message as determined by the counter and replaces the old time value by this sum. In this manner, the master and remote stations can be time synchronized.

Method and apparatus for determining the elapsed time between an initiating event and some other event are disclosed by U.S. Pat. No. 4,449,830, issued to Bulgier. A first timer and a second time mark the times of occurrence, respectively, of an initiating event and a subsequent event that depends upon occurrence of the initiating event. The two timers are initially connected and synchronized, then disconnected before the initiating event occurs. The timers are then reconnected after both events have occurred, to allow determination of the elapsed time between occurrence of the two events.

Distance ranging and time synchronization between a pair of satellites is disclosed by Schwartz in U.S. Pat. No. 4,494,211. Each satellite transmits a timing signal and receives a timing signal from the other satellite. The difference in time, including compensation for signal processing delay on a satellite, between transmission and receipt of the signals is transmitted by each satellite to the other satellite and is used to establish time synchronization and to determine the distance between the two satellites. This exchange of signals would be repeated at selected time intervals to maintain synchronization, where the satellites are moving relative to each other. No communications link to a third entity is required, and only one of the satellite clocks need be adjusted to establish and maintain time synchronization.

In U.S. Pat. No. 4,543,657, Wilkinson discloses a system for synchronizing two clocks by transmission of a single pseudo-random number (PRN) that is an unbroken stream of bits by a master clock. At any point in time, the accumulated partial bit stream represents a unique time of day. One bit of the number is transmitted every 10 msec, and the bit stream recycles every 24 hours. The total coded signal for 24 hours is thus 8,640,000 bits long, and the time resolution is ±5 msec. The partial bit stream is received and decoded by a receiver and applied to synchronize a remote clock associated with this receiver. In order to compensate for signal propagation time between the clocks, it appears that the distance between the master and remote clocks would have to be known and fixed. An earlier U.S. Pat. No. 3,852,534, issued to Tilk, discloses a method for maintaining synchronization between two pseudorandom number generators at spaced apart locations, using a common time generating source. The times for signal propagation between the two generators may vary.

Plangger et al, in U.S. Pat. No. 4,582,434, disclose transmission and receipt of a continuously corrected single sequence of timing signals. A microprocessor at the receiver periodically compares these timing signals with on-board timing signals generated by a local clock. A varactor diode in a crystal oscillator circuit is adjusted to adjust the microprocessor's operating frequency to minimize any error between the two timing signal sequences. Timing signal processing delay time is compensated for in a receiver circuit. The frequency for microprocessor operation is continuously corrected. If the transmitted timing signals are too weak or do not arrive, the on-board timing signals control the microprocessor until the transmitted timing signals are received in sufficient strength again.

A remote time calibration system using a satellite is disclosed in U.S. Pat. No. 4,607,257, issued to Noguchi. A base station provides a reference system of absolute timing signals and transmits these to a satellite that orbits the Earth. The satellite then calibrates and periodically adjusts its internally generated time and transmits observed data plus the corresponding adjusted satellite time to one or more data receiving stations on the Earth that are distinct from the base station. Time calibration optionally compensates for signal propagation time delay from base station to satellite and allows continuous transmission of data from satellite to the data receiving station(s). Several time difference indicia are computed here.

In U.S. Pat. No. 4,809,005, Counselman discloses a system for accurately determining the location of a waterborne vessel, using four or more intercommunicating, land-based GPS stations with fixed locations, where a designated GPS station collects and communicates GPS station information to the vessel. This configuration is also used to measure the vessel location relative to the location of the designated GPS station.

Olsen et al, in U.S. Pat. No. 4,814,711, disclose a real time geophysical survey system including four or more GPS satellites, a fixed base station on the ground, and one or more GPS data acquisition vehicles that communicate with the central station and that receive GPS signals from the satellites. Each vehicle determines its approximate horizontal location, and the central station transmits signals to guide each vehicle along a selected pattern for purposes of collecting survey data. Periodically, the survey data are transmitted by each vehicle to the central station for analysis, display and/or storage, using time-synchronized signals.

A system for obtaining orbital data from GPS satellites is disclosed by Counselman, in U.S. Pat. No. 4,912,475. Satellite signals are received by three or more spaced apart, fixed ground stations that form a network of baselines between these stations. The ratio of maximum baseline length to minimum baseline length is much greater than 1. From the satellite signals received at each pair of base stations, certain double-differenced carrier phase measurements are formed and formed and used to resolve phase integer ambiguities associated with carrier phase signals received at the base stations.

Hatch discloses a method for resolving the integer ambiguities associated with use of GPS carrier phase data in U.S. Pat. No. 4,963,889, using a reference receiver, a roving receiver and the L1 and L2 carrier phase information received from three or more GPS satellites. The procedure identifies a large group of candidate integer solutions and then successively eliminates most of these candidates by use of further constraints.

U.S. Pat. No. 5,099,245, issued to Sagey, discloses an airborne vehicle location system that uses one or more satellites and three or more spaced apart base stations with fixed, known locations on the ground to determine the location of the vehicle. Signals are transmitted by the vehicle to the base stations, to the satellite, and relayed by the satellite (acting as a "bent pipe" transponder) to a separate central station. The distance of each base station from the airborne vehicle is determined by relative time delays for arrival of these signals at the central station, and these distances determine the location of the airborne vehicle.

A system for determining the location of a mobile station, using two or more signal relay satellites with known locations and a base station on the ground is disclosed by Toriyama, in U.S. Pat. No. 5,111,209. The mobile station transmits an initiating signal to a first satellite, and this signal is relayed to the base station. The signal is than transmitted simultaneously to the first and second satellites, which relay this signal to the mobile station. The location of the mobile station is determined by the relative times at which these relayed signals from the two satellites are received by the mobile station.

Allison, in U.S. Pat. No. 5,148,179, discloses a method for obtaining differential corrections to GPS location determination, using carrier phase information. Pseudorange double differences involving a reference receiver, a roving receiver, a pivotal satellite and three other satellites are formed and used to estimate or resolve the integer ambiguities associated with carrier phase data. The method can be used with a linear combination of the L1 and L2 GPS carrier signals or where only one of these two signals is available.

U.S. Pat. No. 5,155,490, issued to Spradley, discloses a geodetic survey system using four or more GPS satellites and three or more GPS base stations with fixed, known locations on the ground. Clock drift and clock offset for a clock in each of the network of base stations is determined and compensated for by time averaging. A mobile station receives location-determining signals from each of the network of base stations and thereby determines its location, by post-processing or by activities that approximate real time processing.

In U.S. Pat. No. 5,138,631, Taylor discloses a satellite communication network having a central station and a plurality of subsidiary stations, all ground-based. An inbound message from a satellite carries packets encoded in CDMA code, indicating the intended destination. The central station receives these messages and transmits the messages to the appropriate subsidiary stations, using TDMA coding, at a faster bit rate. The central station may serve several groups of subsidiary stations, each using a different CDMA code.

Penrod, in U.S. Pat. No. 5,220,333, discloses a method for synchronizing a given clock time to Universal Coordinated Time (UTC) from a sequence of LORAN-C signal transmissions. The time must be initially accurate to within 100 msec of UTC, and the location of the clock must be initially known to within 5 miles. The system then resynchronizes this time to UTC, accurate to within a few msec, by identifying the correct LORAN-C time cycle and compensating approximately for receiver time delay and signal propagation time delay.

The approaches disclosed in these patents generally: (1) assume that the location of each timing signal recipient is known precisely, or (2) usually provide timing signals and/or location signals that are, at best, accurate to within a few nanoseconds or (equivalently) to within a few meters or (3) do not provide real-time signals with high accuracy for timing synchronization or location determination. What is needed is a system that provides real-time or near-real-time signals to support radio-based location determination, where the system has associated inaccuracies of no more than a few centimeters and provides the particular accuracy required for resolving integer ambiguities. Preferably, the system should reduce the biases that currently limit the usefulness of the MLIAR technique and should reduce or eliminate the additional bias intentionally introduced by the U.S. Department of Defense.

Some systems are currently available that perform this function over distances of the order of 10–20 kilometers (km). An example of such a current system is the Hatch patent, U.S. Pat. No. 4,963,889, discussed above. However, the accuracy of such a system quickly degrades with distance so that integer ambiguity resolution techniques cannot be used distances of the order of 100 km or more. To be practical, a service area for a location determination system should extend over a 100-km broadcast radius for a typical tower-based, line-of-sight radio transmitter. Preferably, the system should provide correction messages for raw carrier phase data and a measure of data reliability for reliability assessment.

SUMMARY OF THE INVENTION

The invention meets this need by providing three or more fixed GPS antennas and associated receiver/processors, referred to as fiducial stations, with known locations that receive and analyze GPS carrier phase signals from three or more GPS satellites, using certain approximations to model or extend the signals over a much larger region S. These fiducial stations are dispersed over the region S and may be positioned at or near the boundary of S or may be positioned throughout the interior of S as well. Each fiducial station typically lies within the broadcast range of a line-of-sight transmitter, such as a commercial FM radio station transmitter, roughly a circle with a diameter of no more than 200 km, and provides service only for those satellites that are visible to all user stations within this network ("common-view" satellites).

A plurality of fiducial stations will report GPS data to a central processing station at selected times, and these data are combined to produce an approximate model that extends over a larger region S having a diameter of up to about 3000 km. At least one of the fiducial stations, which serves as a master fiducial station (MFS), sends data to the central station at a relatively high data rate, at least once every 15 seconds for static survey service and at least once every 4 seconds for certain real-time kinematic services. The remaining subsidiary fudicial stations (SFSs) may send data to central station at a lower rate, at least once every 1200 seconds.

Carrier phase GPS data may be provided for the mobile station or user by the central station by at least two methods: (1) broadcast directly by the fiducial stations and the central station by at least two methods:(1) data are broadcast directly by the the central processing station, where these data are integrated into an efficient model that approximates all signals, and the parameters of this model are broadcast by the central station to the community of users.

The data broadcast to the user may include information on how to adjust the carrier phase data received by the user for horizontal displacement and/or for vertical displacement and/or for ionospheric refraction of signals and/or changes due to tropospheric signal propagation time delay, and other items. Data from redundant fiducial stations and/or redundant satellites may be used to provide assessments of the quality of the data, through a comparison of velocity and/or location determinations based upon different signals. The user assembles the carrier phase data received from the central station, or from the fiducial stations themselves, and determines what carrier phase corrections a local fiducial station would have broadcast for use by the user. This message stream from the central station may be applied on-the-fly by a mobile station to provide fast integer ambiguity resolution in the field. This message stream can also be uniquely tailored for use by a surveyor or navigator in the region S.

At the central station, the data are formatted for transmission to the user in a form that allows reconstruction of the essence of the raw observables. The MFS data are transmitted at a relatively high rate, and the differences between MFS data and the SFS data are transmitted at a lower rate. The MPS data can be compressed by using the natural relationships that exist between such data and can be transmitted to the user at relatively high update rates (once every 0.1–15 sec, preferably every 1–4 sec).

Because the satellite-station range values, computed conventionally and by code phase and carrier phase measurements, are quite large ($\approx 26,000$ km) and track each other closely, it is natural to transmit the differences between the conventionally computed range and each of the code phase-based and carrier phase-based ranges and to transmit these data as correction data. These correction data require inclusion of an identifier for the orbit data set used to compute the range, sometimes referred to as the Issue Of Data Ephemeris (IODE), and an ephemeris offset, if the user is currently using an older orbit data set.

Another method of minimizing the dynamic range of the data is by use of single difference for the current data relative to a pivotal satellite. This removes errors and offsets that are common to all satellites, such as the clock offset of a fiducial station.

DETAILED DESCRIPTION OF BEST MODE OF THE INVENTION

Figure 1:
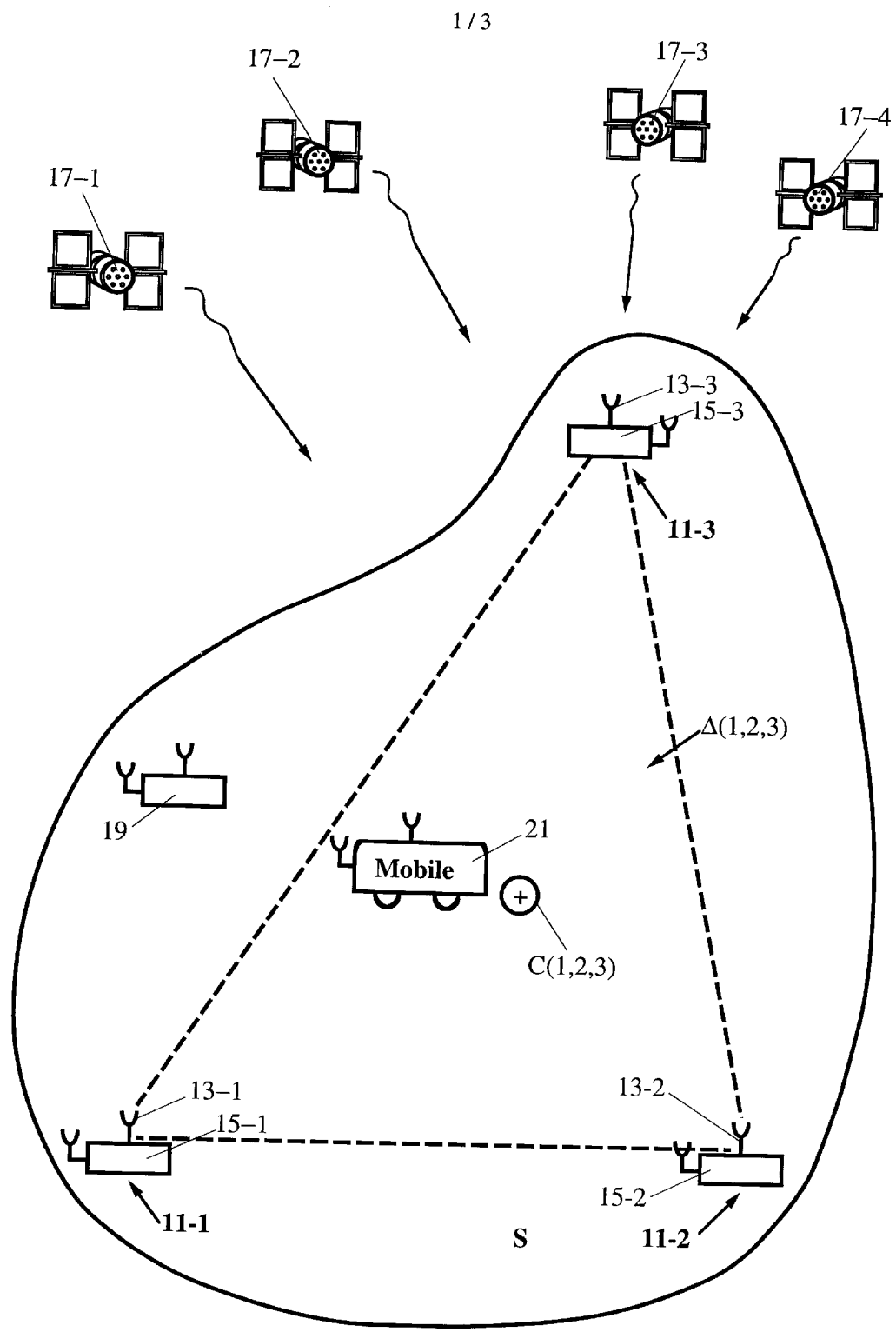
FIG. 1 illustrates an environment in which the invention is used.

FIG. 1 illustrates use of the invention to cover a large region S, which is typically no more than 3000 km in diameter and may be smaller than 100 km in some situations. Each of a plurality of N fiducial, satellite-based, location determination stations ($N \geq 3$) 11-1, 11-2, 11-3, . . . ,11-N, with corresponding GPS signal antennas 13-1, 13-2, 13-3, . . . ,13-N and GPS signal receiver/processors 15-1, 15-2, 15-3, . . . , 15-N, receives location determination signals, such as GPS signals or GLONASS signals, from M common-view GPS satellites ($M \geq 3$) 17-1, 17-2, 17-3,. . . , 17-M. A "commonview" satellite is visible from the sites of each of the fiducial stations at the same observation times. A Global Positioning System (GPS) and a Global Orbiting Navigation System (GLONASS) are described below. For convenience, the system used and the signals analyzed will be referred to as a "GPS" and "GPS signals", respectively.

A "fiducial station" or "fiducial point" is a GPS station or point whose location coordinates are accurately known; determination of the baseline between any other point, such as a mobile GPS station or user, and the fiducial station establishes the location of that other point. A fiducial station can supply unprocessed, partly processed or fully processed carrier phase data to a navigation processor at the mobile station 21.

To implement MLIAR algorithms, the mobile station 21 computes single-difference or double-difference Accumulated Delta Range (ADR) residuals for each GPS satellite 17-m. One ADR residual is the difference between the measured, cumulative carrier phase (CCP) and the computed or theoretical range ("theorange"). The ADR includes a range to the satellite and, optionally, ionospheric and/or tropospheric signal propagation time delay, satellite and GPS receiver clock offsets and clock errors, and orbit and atmospheric modeling errors.

A single-difference ADR is the difference between GPS signal values for a mobile station 21 and a fiducial station 11-n (fixed at the end of a baseline), where the same satellite is used for both stations. Forming single-differences removes the effects of errors common to two receivers over long distances, including Selective Availability clock dither and much of the residual error in an atmospheric time delay model. A double-difference is the difference between two single-differences, referenced to two different satellites and a single station. Forming a double-difference removes errors common to two, or to all, satellites, including the differential clock offset between two receivers on a baseline.

If a single fiducial station is used, the GPS information transmitted by that station can be unprocessed cumulative carrier phase (CCP) measurements or processed CCP residuals. One advantage of transmission of CCP residuals or corrections is that the dynamic range of the residuals is much smaller than the dynamic range of the measurements themselves. However, use of CCP residuals requires that the orbit data used by a fiducial station and a mobile station are coordinated; the fiducial station sends out ephemeris adjustments for mobile stations that do not promptly communicate with the fiducial station. If raw ADR measurement information is transmitted, the mobile station constructs the double-difference values using its own orbit data, and coordination is not required.

In a preferred mode of the invention, a network of fiducial stations transmits GPS information that allows the mobile station to reconstruct the GPS information ("virtual data") that would have been sent from a (virtual) fiducial station, located near or next to the mobile station. This virtual data may be either unprocessed CCP measurement information or ADR residuals, depending upon mobile station requirements. CCP information can be sent directly to the mobile station by a data link, to be combined therein to provide virtual data. An alternative method with lower bandwidth requirements assembles the GPS information from all fiducial stations at a central processing station, then combines this information to form a parametric model from which virtual data can be computed anywhere in the region S. In either instance, the mobile station must provide an initial estimate of its own location.

In a first embodiment of the invention, each fiducial station 11-n (n=1, 2, . . . , N) performs its own signal processing and issues its own data signals for use by a GPS mobile station 21. The location coordinates of each of the fiducial stations 11-n, etc. are known with high accuracy, either by use of a survey or by some other means. A fiducial station 11-n receives the data signals from three or more satellites 17-m (m=1, 2, . . . , M), determines its own pseudorange corrections and resolves its own carrier phase integer ambiguities, and sends this information to any mobile stations within about 100–200 km of this fiducial station. A mobile station 21 located near this fiducial station receives this information and determines its own pseudorange corrections and resolves its own carrier phase ambiguities based on the information this mobile station receives from nearby fiducial stations.

In a second embodiment of the invention, the fiducial stations receive GPS signals from the satellites 17-m, perform some initial processing (or no processing) and send fiducial output signals directly or indirectly to a central data processing station 19 for further signal processing and determination of parameters to be used for a region-wide model for pseudorange corrections of the GPS signals. The central station 19 includes a fiducial signal antenna and receiver and a computer for processing and analyzing the signals. The central station 19 has at least one high speed data link HS (updates every 0.115 sec), such as an RS-232 link, to one of the fiducial stations 11-1, which serves as the master fiducial station (MFS); the MFS may also operate as the central station 19. Each of the other fiducial stations 11-n (n≧2) functions as a slave fiducial station (SFS) and sends signals received at that other fiducial station to the MFS 11-1 by a low speed data link LS (e.g., once every 15–1200 sec) or by a high speed data link. Alternatively, each fiducial station 11-n (n≧1) can send its information directly to the central station 19. The central station 19 receives an update of carrier phase data from all fiducial stations, in processed, partly processed or unprocessed form, from the MFS 11-1 or from all fiducial stations 11-n at least once in every time interval of length 15–1200 sec (preferably once every 0.1–15 sec). Typical updated carrier phase data received by the central station 19 include the following information:

(a) time of observation or measurement;

(b) satellite identification number (pseudorandom noise number for GPS);

(c) code phase data (for both L1 and L2 carriers, if available);

(d) carrier phase data (for both L1 and L2 carriers, if available);

(e) Doppler shift data (for both L1 and L2 carriers, if available);

(f) cycle lock counter (for both L1 and L2 carriers, if available).

Information transmitted by a fiducial station 11-n to the central station 19, by a fiducial station to a mobile station 21, and/or by a central station to a mobile station can, optionally, be compressed before transmission and decompressed at the central station, using data compression techniques such as run length encoding, the JPEG standards or any other suitable data compression algorithm.

The measurement time may be the same for all satellite measurements in a single epoch. Doppler shift data are derived from closely-spaced carrier phase data and are used principally for small realignments of this data. These realignments may be omitted if the fiducial station receiver/processors are already synchronized to within a few microseconds and the data have been propagated with the same time tag. The cycle slip counter is incremented if an uncorrected cycle slip occurs during carrier tracking, which requires a new resolution of the integer ambiguities associated with use of carrier phase data. U.S. Pat. Nos. 4,912,475, issued to Counselman, and 4,963,889, issued to Hatch, discussed above, present good discussions of use of carrier phase data and of resolution of the associated integer ambiguities.

Figure 2A:
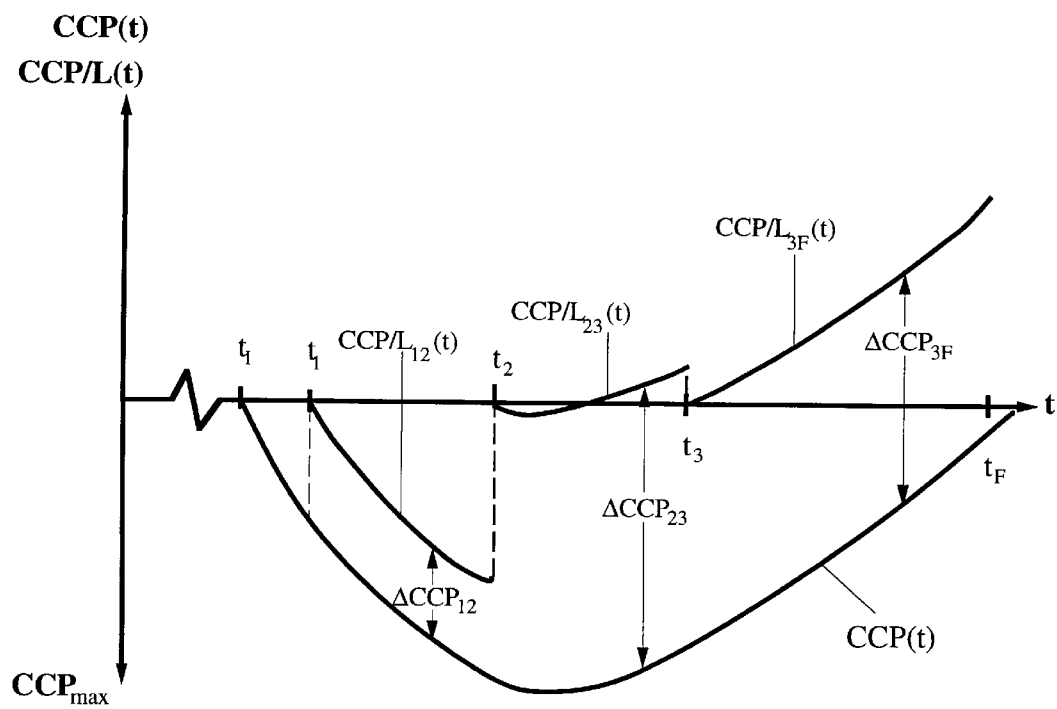
FIGS. 2A, 2B and 2C are graphical views of different measures of carrier phase and carrier phase differences that can be used according to the invention.
Figure 2B:
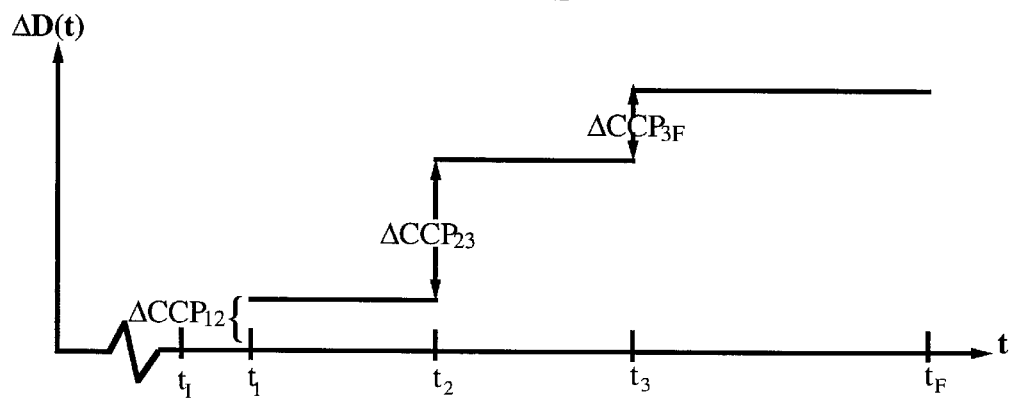
Figure 2C:
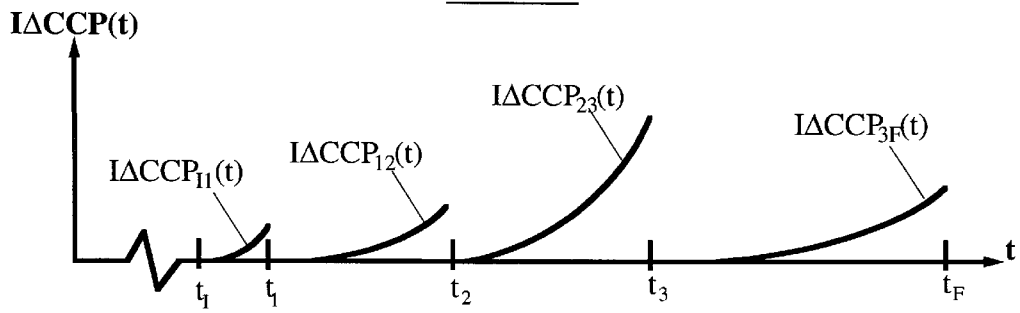

FIGS. 2A, 2B and 2C illustrate three of the many measures of carrier phase error that can be measured and/or calculated and analyzed by a fiducial station 11-n or by the central station 19. FIG. 2A shows a first cumulative carrier phase curve CCP(t), representing the theoretical distance or theorange, expressed in meters, between a given GPS satellite and an observation point OP (fixed on and rotating with the Earth) for a time interval $t_I \leq t \leq t_F$. This satellite first becomes visible at one horizon at a time $t_I$, moves across the portion of the sky observed from the point OP, and first becomes non-visible at a time $t_F$. The total distance C(t) is a continuous function and attains a maximum value $C_{max}$ at a central location in the visible sky.

When a phase lock is lost at some time, such as at $t=t_i$ ($t_I < t_i < t_F$; i=1,2,3), the (discontinuous) integer part of the cumulative carrier phase function CCP/L(t) is reinitialized to zero, and begins accumulating again, with an error $\Delta CCP_{i,i+1}(t)$ that is non-zero and constant in each time interval $t_i \leq t \leq t_{i+1}$ (i=0,1,2,3, with $t_0=t_I$ and $t_4=t_F$), as illustrated in FIG. 2B. In FIG. 2B, the quantity $\Delta CCP_{i,i+1}(t)$ is the difference between the accumulated delta range $CCP/L_{i,i+1}(t)$ and the theorange CCP(t) in the appropriate time interval. Two suitable measures of carrier phase error are $CCP/L_{i,i+1}(t)$ from FIG. 2A and $\Delta CCP_{i,i+1}(t)$ from FIG. 2B. A third suitable measure of carrier phase error is the time integral of the difference $$(d/dt)(CCP-CCP/L)=RCCP(t)-RCCP/L_{i,i+1}(t)=I\Delta CCP(t)$$

between the rates of change of the accumulated delta range CCP/L and the theorange CCP(t), which is illustrated in FIG. 2C. The quantity $I\Delta CCP(t)$ will drift away from the zero value because of satellite clock drift, receiver clock drift, time delay for signal propagation in the ionosphere and troposphere, and other errors. Compensation for clock drift is renewed, and $I\Delta CCP(t)$ is reset to zero, each time satellite lock is reacquired.

Each fiducial station 11-n in FIG. 1 receives GPS carrier phase from each of the M satellites (M≤3 for each station), but M need not be the same for each fiducial station. Each fiducial station can locally process its own received GPS signals, determine its own carrier range corrections, and transmit these corrections, for use by the central station 19 or by a nearby mobile station 21. At least one of the fiducial stations 11-n should transmit its corrections data at a high data link rate, at least once every 0.1–15 sec. The remaining fiducial stations 11-n may transmit their corrections data at a high data link rate or at least at a low data link rate, once every 15–1200 sec. Alternatively, a fiducial station 11-n can transmit its corrections data, partly processed or unprocessed, to the central station 19, for further processing and transmission of the processed corrections information by the central station.

If the number N of fiducial stations 11-n exceeds 3, the central station 19 can apply its carrier range corrections model to N-3 of the fiducial stations to check for internal consistency or "goodness of fit" of the model. This check may use as a measure of consistency or quality a minimized sum $\Sigma$ of squares of error terms for the carrier ranges, as corrected by the model, at each of the N fiducial stations. If this sum $\Sigma$ exceeds a selected threshold $\Sigma_{thr}$, the model or the data used in the model might be rejected or redetermined. Optionally, the carrier range corrections model may assume that the carrier range corrections vary linearly, or nearly linearly, along a line segment extending between two fiducial stations, with a small quadratic or higher power term being used if the linear model is not sufficiently accurate.

In the first embodiment, illustrated in FIG. 1, three fiducial stations 11-1, 11-2 and 11-3 are vertices of a triangle $\Delta(1,2,3)$ with a triangle centroid C(1,2,3). A mobile station 21 is positioned, and perhaps moving, inside or on the boundary of this triangle. Each mobile station has stored in its memory the three-dimensional spatial coordinates $(u_n, v_n, w_n)$ of all GPS fiducial stations 11-n within the region S. Optionally, a mobile station such as 21 also has stored the spatial coordinates $(u_{C(1,2,3)}, v_{C(1,2,3)}, w_{C(1,2,3)})$ of the centroid of the triangle $\Delta(1,2,3)$ that contains that mobile station. The spatial coordinates of the centroid C(1,2,3) are defined by the relations $$u_{C(1,2,3)}=[u_1+u_2+u_3]/3, \quad (2)$$

$$v_{C(1,2,3)}=[v_1+v_2+v_3]/3, \quad (3)$$

$$w_{C(1,2,3)}=[w_1+w_2+w_3]/3, \quad (4)$$

It is assumed that no three GPS fiducial station sites are collinear and that no four GPS fiducial stations are coplanar in this coordinate system. The mobile station 21 also has stored in memory its last location fix (u',v',w'), expressed in the same spatial coordinate system.

More generally, let $(u_{n(k)}, v_{n(k)}, w_{n(k)})$ (k=1,2,3) be the spatial coordinates of the three GPS fiducial stations 11-n(k) within the region S that define a triangle $\Delta(n(1),n(2),n(3))$, having centroid spatial coordinates $(u_{C(1,2,3)}, v_{C(1,2,3)}, w_{C(1,2,3)})$ and containing the mobile station 21. The fiducial stations that define the triangle $\Delta(n(1),n(2),n(3))$ are "bounding" for the mobile station 21 if that mobile station lies within or on the boundary of the triangle $\Delta(n(1),n(2),n(3))$.

Now express the last location fix coordinates (u',v',w') of the mobile station 21 as linear convex combinations of the corresponding coordinates of K GPS fiducial stations (K≥3), viz.

$$u' = \sum_{k=1}^{K} a_k' u_{n(k)} = \sum_{k=1}^{K} u_{n(k)}/3 + \sum_{k=1}^{K} (a_k' - 1/3)u_{n(k)}, \quad (5)$$

$$v' = \sum_{k=1}^{K} a_k' v_{n(k)} = \sum_{k=1}^{K} v_{n(k)}/3 + \sum_{k=1}^{K} (a_k' - 1/3)v_{n(k)}, \quad (6)$$

$$w' = \sum_{k=1}^{K} a_k' w_{n(k)} = \sum_{k=1}^{K} w_{n(k)}/3 + \sum_{k=1}^{K} (a_k' - 1/3)w_{n(k)}, \quad (7)$$

$$1 = \sum_{k=1}^{K} a_k'. \quad (8)$$

The first of the two sums on the right hand side of each of Eqs. (5), (6) and (7) is the corresponding centroid coordinate, and the second of each of these sums is the corresponding spatial coordinate for the displacement of the mobile station 21 from the centroid C(n(1),n(2),n(3)), for the triangle $\Delta(n(1),n(2),n(3))$ that contains the mobile station 21.

Each fiducial station 11-n(k) (k=1,2,3) has an associated phase integer ambiguity for GPS signals received from each satellite 17-m. However, the spatial coordinates $(u_{n(k)}, v_{n(k)}, w_{n(k)})$ (k=1,2,3) for each of these fiducial stations are accurately known, and the carrier phases $\Phi(t;t0;m;n(k))$ for the satellite 17-m at the fiducial station 11-n(k) can thus be accurately determined for each fiducial station and each satellite whose GPS signals are received at that fiducial station.

A mobile station 21 can use the parameters $\{a_k'\}$ to the pseudorange corrections PRC(t;t0;m;mobile) and corrections $\chi$(t;t0;m;mobile) for the carrier phase signals $\Phi$(t;t0;m;mobile) for times t≧t0 for the mobile station 21 for each satellite 17-m by constructing the PRC and carrier phase values $\Phi$ for a virtual fiducial station whose spatial coordinates, $(u_{n(k)}, v_{n(k)}, w_{n(k)})$ (k=1,2,3), coincide with the spatial coordinates of the mobile station. These PRC and $\Phi$ values become $$PRC(t;t0;m;\text{mobile}) = \sum_{k=1}^{K} a_k' PRC(t;t0;m;n(k)), \quad (9)$$

$$\Phi(t;t0;m;\text{mobile}) = \sum_{k=1}^{K} a_k' \Phi(t;t0;m;n(k)). \quad (10)$$

These PRC and $\Phi$ values can also be decomposed into a sum of the PRC and $\Phi$ values at the centroid of the triangle $\Delta(n(1),n(2),n(3))$ and adjustments of the respective PRC and $\Phi$ values for the displacements of the mobile station spatial coordinates (u',v',w') from the centroid coordinates, by analogy with Eqs. (4), (5) and (6). The centroid spatial coordinates $(u_{C(1,2,3)}, v_{C(1,2,3)}, w_{C(1,2,3)})$ may be replaced by the spatial coordinates of any other location within the triangle $\Delta(n(1),n(2),n(3))$ in Eqs. (5), (6) and (7).

This embodiment uses receipt by a mobile station 21 of signals received and retransmitted or rebroadcast by three or more fudicial stations that from a bounding polygon for the mobile station 21, and it is assumed that the region S is part of a known two-dimensional surface, such as a planar or spherical surface. No central station signal processing is required here. If the mobile station 21 is allowed to have any three-dimensional location, the bounding triangle $\Delta(n(1),n(2),n(3))$ defined by three vertices is replaced by a tetrahedron (or more general polyhedron) that is defined by four or more spatial coordinate triples $(u_{n(k)}, v_{n(k)}, w_{n(k)})$ (k=1,2,3,4), and each of the sums in Eqs. (4)–(9), is modified by replacement of the upper K≧3 in these sums by a new upper limit K≧4.

An alternative approach selects K fiducial station locations (K≧3) with coordinates $(u_{n(k)}, v_{n(k)}, w_{n(k)})$, which together form a bounding polygon, and chooses coefficients $a_k'$ so that $$\varepsilon = \left\| u' - \sum_{k=1}^{K} a_k' u_{n(k)} \right\|^p \quad (p > 0) \quad (11)$$

is minimized, under the constraint $$a_1' + a_2' + \ldots + a_K' = 1, \quad (-0.5 \leq a_k' \leq 1.5). \quad (12)$$

The constraint of Eq. (12) allows the mobile station location to lie outside but near the boundary of the polygon defined by the coordinate triples $(u_{n(k)}, v_{n(k)}, w_{n(k)})$.

Another possible procedure for determining the quantities $a_k'$ in Eqs. (9) and (10) is a stochastic blending of the PRC signal values over some time interval, using a least squares, minimum variance, maximum likelihood or Kalman filtering formalism to determine the coefficients $a_k'$. This approach could utilize the PRC signal values for all the GPS fiducial stations over a selected time interval.

Pseudorange, or an equivalent theorange having the dimensions of length, is a time offset or equivalent spatial offset that must be applied to a GPS signal receiver's clock to create a time-based P-code or C/A-code to achieve maximum cross-correlation amplitude with a corresponding code received from a GPS satellite being tracked. The measured pseudorange PR(t;t0;m;n) for times t≧t10 for a given satellite 17-m and a given GPS signal receiver/processor 11-n is described by the relation $$PR(t;t0;m;n) = R + \phi_{rcvr} - \phi_{sat} + \delta T + \delta I + \delta e, \quad (13)$$

R=range from receiver antenna to satellite antenna, (14)

$\phi_{rcvr}$=receiver clock offset with respect to GPS time, (15)

$\phi_{sat}$=satellite clock offset with respect to GPS time, (16)

$\delta T$=signal propagation time delay in troposphere, (17)

$\delta I$=signal propagation time delay in ionosphere, (18)

$\delta e$=residual measurement errors, including multipath, (19)

where each of the quantities on the right in Eq. (13) will also vary with time t, choice of GPS receiver/processor (often referred to as simply a GPS "receiver" herein for convenience) and/or choice of GPS satellite. The propagation velocity c of electromagnetic waves in the atmosphere can be used to convert the times in Eqs. (13)–(19) to equivalent distances.

The difference between measured pseudorange at a fiducial station and calculated pseudorange from Eq. (13), using the known spatial coordinates of the fiducial station, is manifested by a composite measurement error in the calculated pseudorange caused by parameter errors in the satellite navigation message, and by errors in compensation for the tropospheric and ionospheric time delays.

A fiducial or mobile station receives code phase signals at the C/A code rate (1.023 MHz) and/or at the P code rate (10.23 MHz) and can use such signals to determine its pseudorange from each satellite and can obtain corrections for these pseudoranges. The wavelengths corresponding to these frequencies are about 29.33 meters and 293.26 meters, respectively.

A fiducial or mobile station also receives carrier phase signals at the carrier frequencies 1.277 GHz and 1.575 GHz for the L2 and L1 GPS carriers, with corresponding wavelengths of about 19.05 cm and 23.50 cm, respectively. The carrier phase signals have smaller associated wavelengths than the code phase signals and, potentially, can provide GPS-determined location coordinates with inaccuracies that are at 1–2 orders of magnitude smaller than the code phase inaccuracies. However, this greater accuracy comes with a price tag: one must determine the carrier wave phases and resolve the well known carrier integer ambiguities before one can use the carrier phase data for location determination. Procedures for resolution of the carrier phase ambiguities are proposed and discussed by Counselman, by Hatch and by Allison in the respective U.S. Pat. Nos. 4,912,475, 4,963,889 and 5,148,179, respectively, discussed above and incorporated by reference herein. These methods use single difference, double difference or triple difference data, formed using two signal frequencies, two satellites, and/or two or three GPS receivers.

In a second embodiment, also illustrated in FIG. 1, the fiducial stations 11-n receive the GPS signals from the satellites 17-m, perform some initial processing of these signals, and send the relevant data to the central station 19 for determination of parameters to be used in an overall model that is applicable to a mobile station 21 anywhere in the region S. This overall model includes determination of the pseudorange corrections anywhere within the region S and, optionally, resolution of the carrier phase ambiguities anywhere or at the fiducial station locations.

The overall model may use a truncated polynomial approximation $$TPRC(t;t0;m,u,v,w) = \sum_{h,j,k} c_{hjk}(m)(u-u0)^h(v-v0)^j(w-w0)^k \quad (20)$$

to estimate the total or overall corrections TPRC at any location given by the spatial coordinates (u,v,w), where (u0,v0,w0) are the coordinates of a selected point. Here the number of fiducial stations N may be 3 or greater. The coefficients $c_{hjk}$ are determined by applying a least squares, minimum variance or maximum likelihood computation to an error term $$\varepsilon = \sum_{n=1}^{N} \sum_{h,j,k} \left[ c_{hjk}(m)(u_n-u0)^h(v_n-v0)^j(w_n-w0)^k - TPRC(t;t0;m;n) \right]^2, \quad (21)$$

where the outer sum is over all N fiducial stations. One suitable approximation from Eq. (20) is linear in each coordinate, viz.

$$TPRC(t;t0;m;u,v,w) = c_{000} + c_{100}(u-u0) + c_{010}(v-v0) + c_{001}(w-w0). \quad (22)$$

Where the elevation variable w can range over distances of the order of one kilometer or more, it may be appropriate to replace Eq. (22) by an almost-linear approximation containing one non-linear term $$TPRC(t;t0;m;u,v,w) = c_{000} + c_{100}(u-u0) + c_{010}(v-v0) + c_{001}(w-w0) + c_{abc}(u-u0)^a(v-v0)^b(w-w0)^c, \quad (23)$$

where a, b and c are arbitrary real numbers, at least one of which is $\neq 0$ and $\neq 1$, and are chosen to improve the accuracy of the elevation component or other components of the GPS-determined location coordinates. Inaccuracy in the GPS-determined elevation coordinate is often 2–4 times as high as the inaccuracy in the other location coordinates determined by a GPS approach. Use of an approximation such as that in Eq. (23) may allow reduction of the elevation location inaccuracy to a number similar to that for the other elevation coordinates.

The PRC signal values are expected to change slowly with the passage of time, as long as each common-view GPS satellite is continuously visible from each of the N GPS fiducial stations. Thus, each PRC signal value may be updated on a 60–120 second cycle. If a brisker update pace is required for a particular fiducial station or satellite, the central station may use a compression algorithm to broadcast some or all PRC signal values more frequently. It is estimated that 200 GPS fiducial stations, suitably positioned with ≈200 km spacing, could cover the contiguous continental U.S., with DGPS location inaccuracies ≦10 cm (1-sigma values).

This approach preferably uses the carrier phase GPS signals for error estimation. Integer ambiguities that are inherent in use of carrier phase GPS measurements are resolved using known techniques. Single frequency or (preferably) dual frequency carrier phase signals are used here, and the frequency-dependent signal propagation delays in the ionosphere and troposphere are modelled or computed and removed.

Figure 3:
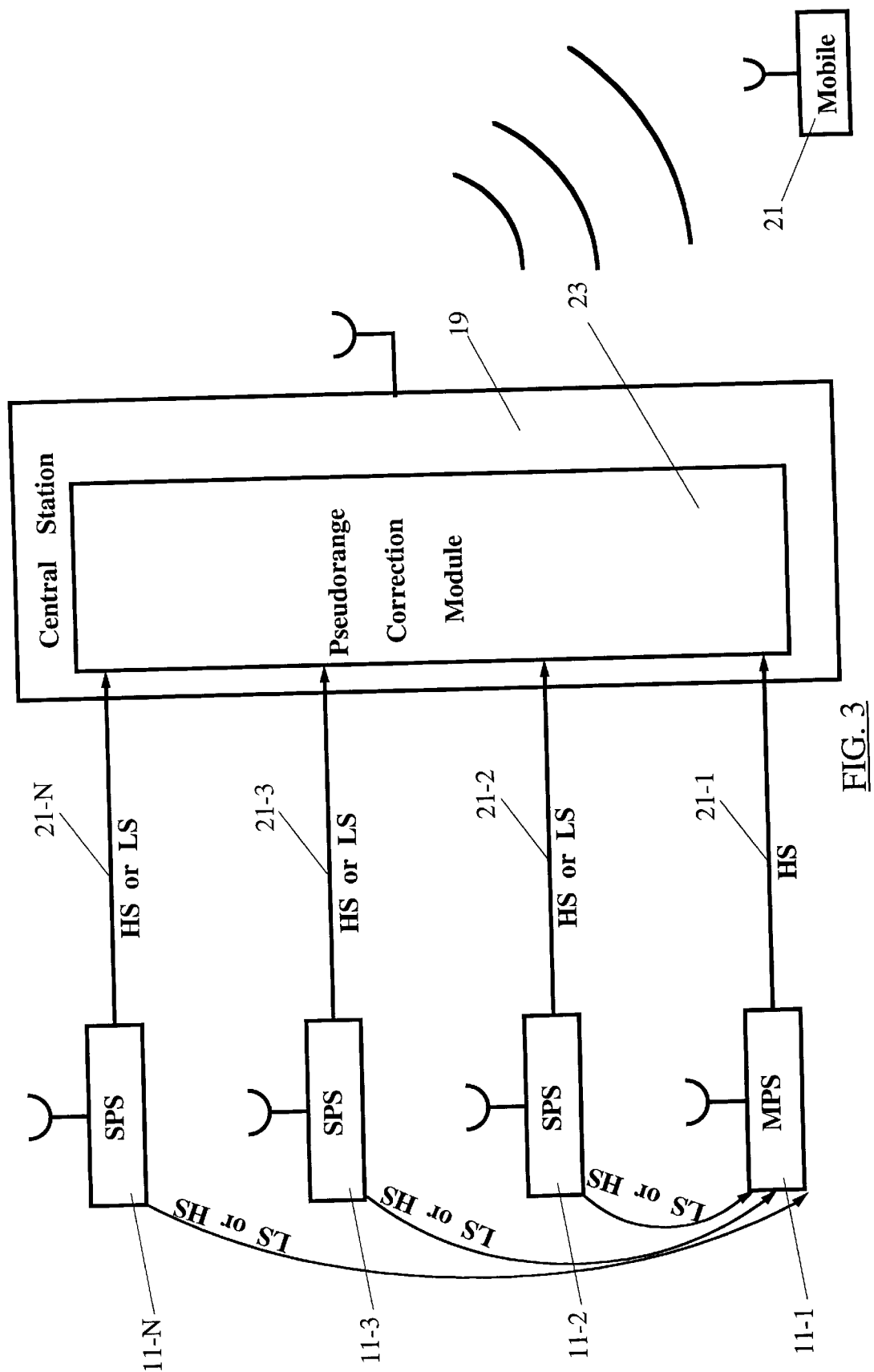
FIG. 3 illustrates one method of sending GPS information, received by the fiducial stations, to the central station according to the invention.

FIG. 3 illustrates one embodiment of apparatus for transmission of the pseudorange and/or pseudorange correction information from each of the fiducial stations fiducial stations 11-n (n=1, . . . , N) to the central station 19 for determination of a total pseudorange correction signal TPRC (t;t0;m) for satellite number m at reference station number n. A plurality of N low-speed or high-speed data links 23-n (n=1, . . . , N), wireless or cable, connect the respective fiducial stations 11-n to a PRC correction module 25 that is part of the central station 19. These N links carry pseudorange information that does not change quickly with time so that each such link can, if desired, be a low-speed link. One high-speed data link 23-1 carries satellite clock corrections and other information that can change quickly and often. The PRC module 25 uses known algorithms to predict or correct the satellite orbit values (ephemeris, etc.) for each satellite m over short periods of time, using known relaxation techniques, and to determine the actual satellite clock corrections, where this is necessary. The satellite orbit predictions and satellite clock corrections are then used to determine the pseudorange corrections PRC(t;t0;m;n) or TPRC(t;t0;m), using approaches such as that outlined above in Eqs. (20)–(23) above or similar approaches, and the corrections are broadcast to all users 21 in the region S. A user 21 can determine, based on its last location fix, the three fiducial stations 11-n that from a bounding polygon for to the user and use the formalism set forth in Eqs. (5)–(10). Alternatively, the user can receive the total pseudorange corrections TPRC(t;t0;m), where these corrections have been determined by a formalism such as that set forth in Eqs. (20)–(23).

In the format defined by some standards used for location determination, the tropospheric and ionospheric propagation time delays are not modelled so that the pseudorange corrections must compensate for the total effects of these time delays.

Where the same models for tropospheric time delays and ionospheric time delays are used for the fiducial stations 11-n and the mobile station 21, the contributions to pseudorange errors of each of these time delays become smaller, because these contributions arise only from differences between the actual and the modelled time delays. Use of pseudorange corrections for a GPS mobile station, based on these corrections at a GPS fiducial station, may have acceptable accuracy only for relatively small mobile station-fiducial station separation distances, no more than 40–100 km.

Alternatively, each fiducial station 11-n can transmit, unprocessed or partly processed, the pseudorange information it receives from each satellite 17-m, together with an indicium that identifies the satellite and fiducial station pair from which this information arises. The central processing station 19 will then perform part or all of the GPS signal processing for each fiducial station/satellite pair, determine the pseudorange corrections PRC for each such pair, determine total PRC parameters that allow computation of (approximate) corrections PRC anywhere in the region S, and broadcast the total pseudorange correction parameters for use by any mobile station within the region S.

The pseudorange corrections PRC(t;t0;m;n), or the unprocessed or partly processed pseudorange information, for all GPS fiducial stations 11-n and all common-view satellites 17-m are transmitted to the central station 19, using radiowave or telecommunications signals with a suitable format, and these correction signals are broadcast with a different carrier frequency to all GPS stations within the region S.

In an alternative approach that can be used with the first or second embodiment, the corrected pseudorange PR components for fiducial station-satellite range R, for tropospheric time delay δT and for ionospheric time delay δI are determined for each common--view satellite 17-m and each fiducial station 11-n, using the decomposition in Eq. (13), and sent to the central station. The pseudorange corrections $PRC_R$, $PRC_T$ and $PRC_I$ for the respective R, δT and δI components are determined, and the sum of the pseudorange corrections $PRC_{rem}$ for the remainder of the pseudorange terms in Eq. (13) are determined. Here, the pseudorange corrections $PRC_T$ and $PRC_I$ are determined using suitable models (double frequency, single frequency or frequency-independent) for the tropospheric and ionospheric time delays. The pseudorange correction terms $PRC_R$, $PRC_T$, $PRC_I$ and $PRC_{rem}$ are then broadcast separately by the central station 19 for each common-view satellite m and fiducial station 11-n.

This approach allows use of different temporal rates for update of different pseudorange components, depending upon how quickly each component changes. The PRC components values $PRC_R$, $PRC_T$ and $PRC_I$ will change more slowly over the course of time than will the PRC values for the sum of the terms shown in Eq. (13) so that these component values need not be computed or broadcast as frequently, if desired. The pseudorange correction terms $PRC_R$, $PRC_T$, $PRC_I$ and $PRC_{rem}$ are received by a mobile station 21 and used to compute its own pseudorange corrections, using Eqs. (13)–(19) for the fiducial stations that are closest to the location of that mobile station, based on its last location fix or its estimated present location. Alternatively, total pseudorange correction components $TPRC_R$, $TPRC_T$, $TPRC_I$ and $TPRC_{rem}$ are can be determined, in a manner analogous to determination of the total pseudorange corrections TPRC shown in Eq. (19), and the component parameters $c_{hjk}(m)$ for each of these components can be broadcast for use by a mobile station 21.

A third approach is analogous to the preceding approach. Surface refractometry measurements are used to determine the tropospheric time delay components $PRC_T$ for the pseudorange corrections, and two frequency measurements (e.g., at L1 carrier and L2 carrier frequencies) are used to determine the ionospheric time delay components $PRC_I$ for the pseudorange corrections. In all other respects, the third approach is parallel to the second approach.

The pseudorange correction information and carrier phase correction transmitted by a fiducial station 11-n or by the central station 19 to the mobile station 21 or to the central station 19 optionally includes ionospheric time delay information such as: (1) raw measurements on the time delay at one or both of two selected frequencies, such as the L1 and L2 carrier frequencies; (2) linear combinations of time delay measurements at each of two or more selected frequencies; and (3) suitable corrections to this information. Use of linear combinations of such measurements is discussed by Hatch in U.S. Pat. No. 4,812,991, incorporated herein by reference.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System (GPS) and the Global Orbiting Navigational System (GLONASS).

The GPS is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

A GPS antenna receives GPS signals from a plurality (preferably four or more) of GPS satellites and passes these signals to an GPS signal receiver/processor, which (1) identifies the GPS satellite source for each GS signal, (2) determines the time at which each identified GPS signal arrives at the antenna, and (3) determines the present location of the GPS antenna from this information and from information on the ephemerides for each identified GPS satellite. The GPS signal antenna and signal receiver/processor are part of the user segment of a Global Positioning System, as discussed by Tom Logsdon in *The NAVSTAR Global Positioning System*, Van Nostrand Reinhold, 1992, pp. 33–90, incorporated by reference herein.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, Sep. 26, 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Logsdon, op. cit.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention. Although the invention disclosed herein is discussed with reference to GPS, the invention can be practiced with any other SATPS as well, such as GLONASS.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, differential positioning, is far more accurate than absolute positioning, provided that the distances between these stations is no more than 10–20 km. Differential positioning can be used for survey or construction work in the field, providing location coordinates and distances that are accurate to within a few centimeters in some situations.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

What is claimed is:

1. A method for determining corrections to carrier phase signals at an arbitrary location, the method comprising the steps of:

determining corrections for carrier phase measurements from each of a plurality of GPS signals received at each of at least three GPS fiducial stations having known locations; and determining a correction function that provides a carrier phase correction, for a GPS signal received at any selected location within a selected region, that is a selected linear combination of the carrier phase corrections determined for each of the at least three of the fiducial stations.

2. The method of claim 1, further comprising the steps of:

obtaining an uncorrected carrier phase measurement from at least one of said received GPS signals at said selected location; and computing said carrier phase correction for the at least one of said received GPS signals, using said correction function, and combining said carrier phase correction with the uncorrected carrier phase measurement to produce a corrected carrier phase measurement at said selected location.

3. The method of claim 1, further comprising the step of computing said carrier phase corrections for said received GPS signals, using said correction functions, and combining each of said carrier phase corrections with a corresponding uncorrected carrier phase measurement to produce a plurality of corrected pseudorange measurements at said selected location.

4. The method of claim 3, further comprising the step of using said corrected carrier phase measurements to determine corrected location coordinates for said selected location.

5. The method of claim 1, further comprising the step of determining said correction function so that, at a location that coincides with said known location of at least one of said GPS fiducial stations, the value of said correction function is approximately equal to said carrier phase correction for at least one of said GPS signals received at said GPS fiducial station.

6. The method of claim 1, further comprising the steps of:

transmitting said carrier phase corrections determined for said at least three of said fiducial stations;

receiving said GPS signals at a GPS mobile station;

estimating the mobile station present location;

receiving said carrier phase corrections for said fiducial stations at the mobile station; and selecting at least one of said correction functions to be a weighted average of said carrier phase corrections received from each of said at least three fiducial stations, based on the relative distances of the mobile station estimated present location from each of said at least three fiducial stations.

7. The method of claim 6, wherein said step of selecting at least one of said correction functions to be a weighted average comprises the steps of:

expressing said mobile station estimated present location as a second selected linear combination of the locations of said fiducial stations whose locations define a bounding polygon for said mobile station; and for at least one satellite from which GPS signals are received at said mobile station, determining a carrier phase correction for the GPS signals received from the at least one satellite at said mobile station as the second selected linear combination, applied to said carrier phase corrections for said fiducial stations.

8. The method of claim 6, further comprising the steps of:
determining corrected carrier phases, for said GPS signals received at said mobile station from at least three satellites, as a combination of said GPS signals received at said mobile station and said carrier phase correction for each of the at least three satellites; and
determining a corrected location of said mobile station from the corrected carrier phases.

9. The method of claim 6, further comprising the step of using a preceding GPS-determined present location of said mobile station as an estimate of said present location of said mobile station.

10. The method of claim 6, further comprising the step of using an uncorrected, GPS-determined present location of said mobile station as an estimate of said present location of said mobile station.

11. The method of claim 6, further comprising the step of transmitting said carrier phase correction signals from each of a selected group of one or more fiducial stations at least once in every time interval of a selected length, where the selected time interval length lies in the range 0.1–15 seconds.

12. The method of claim 6, further comprising the step of transmitting said carrier phase correction signals from each of a selected group of one or more fiducial stations at least once in every time interval of a selected length, where the selected time interval length lies in the range 15–900 seconds.

13. The method of claim 6, further comprising the steps of:
applying data compression to said carrier phase correction signals before said carrier phase correction signals are broadcast by at least one of said fiducial stations; and
applying data decompression to said carrier phase correction signals received by said mobile station from each fiducial station that broadcasts these signals in data compressed format.

14. The method of claim 1, wherein said steps of determining said carrier phase corrections for said plurality of GPS signals received at each of said plurality of GPS fiducial stations and determining said carrier phase correction function comprise the steps of:
receiving at said at least three GPS fiducial stations said GPS signals including carrier phase information from at least three GPS satellites; and
computing and broadcasting a carrier phase correction for said GPS signals received from each of the at least three satellites at each of said at least three fiducial stations, using the GPS signals at each fiducial station, computing carrier phase correction signals $\Phi C(t;m;n)$ for carrier phase signals measured at fiducial station number n from said GPS signals received from satellite number m, to reconcile the GPS-determined carrier phase signal with a theoretical carrier phase signal for fiducial station number n, based on the known locations of said fiducial stations and of the satellites, and transmitting the carrier phase correction signals for at least three of said fiducial stations.

15. The method of claim 1, wherein said step of determining said carrier phase measurement corrections comprises the steps of:
receiving at N spaced apart GPS fiducial stations, numbered $n=1, 2, \ldots, N (N \geq 3)$, whose locations are known, said GPS signals from M GPS satellites, numbered $m=1, 2, \ldots, M (M \geq 3)$, whose locations are known, and measuring the carrier phase $\Phi(t;m;n)$ of said GPS signals received from each satellite, as a function of time t; and
computing carrier phase correction signals $\Phi C(t;m;n)$ for carrier phase signals measured at fiducial station number n from said GPS signals received from satellite number m, to reconcile the GPS-determined carrier phase signal with a theoretical carrier phase signal for fiducial station number n, based on the known locations of said fiducial stations and of the satellites, and transmitting the carrier phase correction signals for at least three of said fiducial stations.

16. The method of claim 15, wherein said step of determining said correction function comprises the steps of:
transmitting said carrier phase corrections $\Phi C(t;m;n)$ determined for at least three of said fiducial stations;
receiving said GPS signals at a GPS mobile station and estimating the mobile station present location using said GPS signals; and
receiving said carrier phase corrections $\Phi C(t;m;n)$ for at least three of said fiducial stations at the mobile station; and
determining a carrier phase correction $\Phi C(t;m;\text{mobile})$ for the mobile station estimated present location for at least one of said satellites as a selected linear combination of the carrier phase corrections $\Phi C(t;m;n)$ for K selected fiducial stations, numbered $n=n(1), n(2), \ldots, n(K)$ $(K \geq 3)$. replacing said mobile station estimated present location by the mobile station corrected present location.

17. The method of claim 16, wherein said step of determining said carrier phase correction $\Phi C(t;m;\text{mobile})$ as a selected linear combination comprises the steps of:
selecting at least one of said carrier phase corrections to be a weighted average of said carrier phase corrections received for each of said at least three fiducial stations, based on the relative distances of the mobile station estimated present location from each of said at least three fiducial stations.

18. The method of claim 17, wherein said step of selecting at least one of said carrier phase corrections to be a weighted average comprises the steps of:
expressing location coordinates $(u(\text{mobile}), v(\text{mobile}), w(\text{mobile}))$ for said mobile station estimated present location as weighted sums $$u(\text{mobile}) = \sum_{k=1}^{K} a_k u_{n(k)},$$

$$v(\text{mobile}) = \sum_{k=1}^{K} a_k v_{n(k)},$$

$$w(\text{mobile}) = \sum_{k=1}^{K} a_k w_{n(k)},$$

where $(u_{n(k)}, v_{n(k)}, w_{n(k)})$ are location coordinates for said fiducial station number $n=n(k)$ in a selected location coordinate system and the coefficients $a_k$ are selected real numbers; and
determining said carrier phase correction $\Phi C(t;m;\text{mobile})$ as a weighted sum $$\Phi C(t;m;\text{mobile}) = \sum_{k=1}^{K} a_k \Phi C(t;m;n(k)).$$

19. The method of claim 17, further comprising the step of determining at least one corrected carrier phase signal ΦC(t;m;mobile;corr) for said mobile station as a sum Φ(t;m;mobile;corr)=Φ(t;m;mobile)+ΦC(t;m;mobile).

20. The method of claim 19, further comprising the steps of:

determining a corrected present location for said mobile station by using said corrected phase signals ΦC(t;m;mobile;corr) for at least three of said satellites; and replacing said mobile station estimated present location by the mobile station corrected present location.

21. The method of claim 20, further comprising the step of displaying, in at least one of visually perceptible form and audibly perceptible form, at least one of said corrected present location for said mobile station.

22. The method of claim 16, further comprising the step of selecting said K fiducial stations to form a bounding polygon for said mobile station.

23. The method of claim 22, further comprising the step of selecting said K fiducial stations so that said bounding polygon for said mobile station has a diameter no greater than about 200 km.

24. The method of claim 1, wherein said step of determining said carrier phase correction function comprises the steps of:

expressing said correction function for at least one carrier phase measurement at said selected location as a selected polynomial in estimated coordinates of said selected location, with polynomial coefficients to be determined;

determining each of the polynomial coefficients as a selected linear combination of said carrier phase corrections for said at least three fiducial stations; and using the determined polynomial coefficients in the selected polynomial, evaluated at the estimated coordinates of said selected location, to estimate the value of said correction function for at least one carrier phase measurement at said selected location.

* * * * *